(12) United States Patent
Sato et al.

(10) Patent No.: US 12,379,561 B2
(45) Date of Patent: Aug. 5, 2025

(54) METHOD FOR LAYING OPTICAL FIBER CABLE

(71) Applicant: SUMITOMO ELECTRIC INDUSTRIES, LTD., Osaka (JP)

(72) Inventors: Fumiaki Sato, Osaka (JP); Yuuki Shimoda, Osaka (JP); Toyoaki Kimura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 177 days.

(21) Appl. No.: 18/188,596

(22) Filed: Mar. 23, 2023

(65) Prior Publication Data

US 2023/0324642 A1 Oct. 12, 2023

(30) Foreign Application Priority Data

Apr. 11, 2022 (JP) ................................. 2022-064986

(51) Int. Cl.
G02B 6/50 (2006.01)
(52) U.S. Cl.
CPC ..................... G02B 6/50 (2013.01)
(58) Field of Classification Search
CPC ......... G02B 6/50; G02B 6/4432; G02B 6/475
See application file for complete search history.

(56) References Cited

U.S. PATENT DOCUMENTS

2022/0057593 A1  2/2022 Abernathy et al.

FOREIGN PATENT DOCUMENTS

JP   H10170778 A  *  6/1998
JP   2015-517679 A    6/2015
WO   2013/165407 A1  11/2013

OTHER PUBLICATIONS

English translation JPH10170778A (Year: 1998).*

* cited by examiner

Primary Examiner — Jason L Vaughan
Assistant Examiner — Amanda Kreiling
(74) Attorney, Agent, or Firm — McDonald Hopkins LLC

(57) ABSTRACT

A method for laying an optical fiber cable including a cable core, a cable sheath that includes an inner jacket and an outer jacket, and a tensile strength member, a first kinetic friction coefficient of the outer jacket being smaller than a second kinetic friction coefficient of the inner jacket to the duct, first flame retardance of the inner jacket being higher than the second flame retardance of the outer jacket. The method includes wiring the optical fiber cable in an outdoor side via the duct, drawing the optical fiber cable from the outdoor side to an indoor side, making a part of the optical fiber cable as an optical fiber cable for indoor wiring by removing the outer jacket after the drawing of the optical fiber, and wiring the optical fiber cable for indoor wiring in the indoor side.

3 Claims, 7 Drawing Sheets

METHOD FOR LAYING OPTICAL FIBER CABLE

TECHNICAL FIELD

The present disclosure relates to a method for laying an optical fiber cable. This application claims priority based on Japanese Patent Application No. 2022-064986 filed on Apr. 11, 2022, and the entire contents of which are incorporated herein by reference.

BACKGROUND

JP2015-517679A discloses an optical fiber cable including an optical fiber ribbon in a pipe, in which at least two optical fibers provided in the ribbon are intermittently connected along the length of the fibers.

SUMMARY

A method for laying an optical fiber cable according to an aspect for achieving the above-described object is a method for laying an optical fiber cable that includes a cable core including a plurality of optical fibers; a cable sheath including an inner jacket disposed at a radially outer side of the cable core, and an outer jacket disposed at a radially outer side of the inner jacket; and at least one tensile strength member embedded in the outer jacket, in which a coefficient of kinetic friction of the outer jacket with respect to a duct is smaller than a coefficient of kinetic friction of the inner jacket with respect to the duct, and the inner jacket has flame retardance higher than the outer jacket. The method for laying an optical fiber cable includes: a step of wiring the optical fiber cable in an outdoor side via the duct; a step of drawing the optical fiber cable from the outdoor side to an indoor side; a step of making a part of the optical fiber cable as an optical fiber cable for indoor wiring by removing the outer jacket after the optical fiber cable is drawn to the indoor side; and a step of wiring the optical fiber cable for indoor wiring to the indoor side.

DETAILED DESCRIPTION

Figure 1:
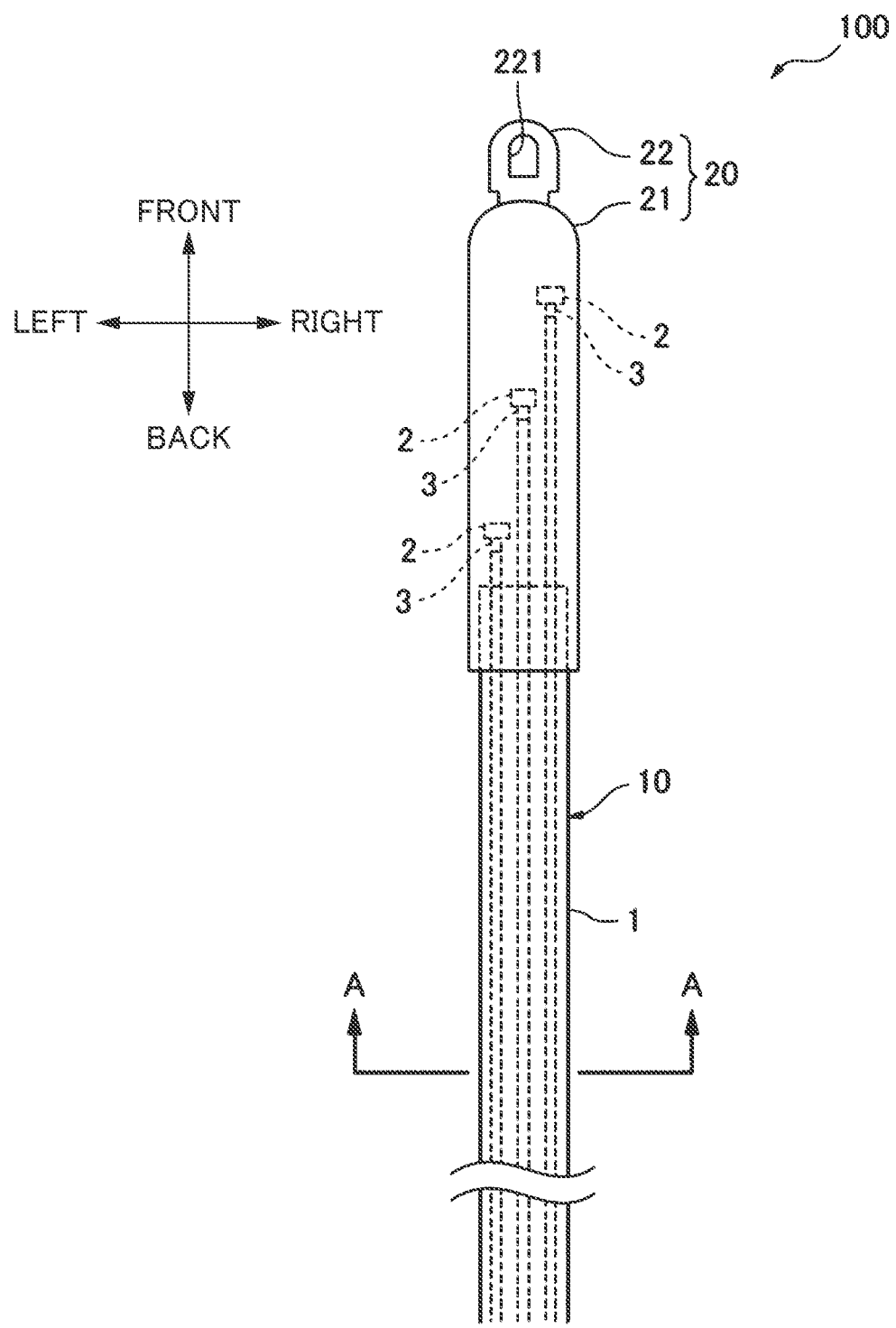
FIG. 1 is a diagram illustrating an optical fiber cable with a towing tool according to an aspect of the present embodiment.

When an optical fiber cable is laid in a building, an optical fiber cable drawn from an outdoor side is connected to another optical fiber cable disposed at an indoor side by, for example, fusion splicing. In recent years, with an increase in the amount of information to be transmitted, a multi-core optical fiber cable including a plurality of optical fibers has appeared. When such a multi-core optical fiber cable including a plurality of optical fibers is laid, a large work load may occur in connection work such as the fusion splicing. Therefore, there is a need to reduce such a work load.

Further, in the optical fiber cable (micro duct cable) which is laid by pressure-feeding air in the duct, it is desirable that a cable sheath has low friction in order to extend a pressure-feeding distance. On the other hand, the optical fiber cable wired at the indoor side is increasingly required to have flame retardance. When insertion characteristics are emphasized, it is necessary to reduce the friction of the cable sheath, but when the cable sheath is formed of a resin material having low friction, the flame retardance of the cable sheath generally decreases. Therefore, it may be difficult to achieve both high flame retardance and good insertion characteristics.

An object of the present disclosure is to provide a method for laying an optical fiber cable capable of improving efficiency of a laying work of an optical fiber cable while achieving both high flame retardance and good insertion characteristics.

According to the present disclosure, the method for laying an optical fiber cable capable of improving efficiency of a laying work of the optical fiber cable while achieving both high flame retardance and good insertion characteristics can be provided.

[Description of Embodiment of Present Disclosure]

First, an embodiment of the present disclosure will be listed and described.

(1) There is provided a method for laying an optical fiber cable that includes a cable core including a plurality of optical fibers, a cable sheath including an inner jacket disposed at a radially outer side of the cable core, and an outer jacket disposed at a radially outer side of the inner jacket, and at least one tensile strength member embedded in the outer jacket, in which a coefficient of kinetic friction of the outer jacket with respect to a duct is smaller than a coefficient of kinetic friction of the inner jacket with respect to the duct, and the inner jacket has flame retardance higher than the outer jacket. The method for laying an optical fiber cable includes a step of wiring the optical fiber cable in an outdoor side via the duct, a step of drawing the optical fiber cable from the outdoor side to an indoor side, a step of making a part of the optical fiber cable as an optical fiber cable for indoor wiring by removing the outer jacket after the optical fiber cable is drawn to the indoor side, and a step of wiring the optical fiber cable for indoor wiring to the indoor side.

According to this configuration, after the optical fiber cable is drawn from the outdoor side to the indoor side, the outer jacket of the optical fiber cable is removed, so that a part of the optical fiber cable is made as the optical fiber cable for indoor wiring. That is, since the optical fiber cable includes the low-frictional outer jacket including the tensile strength member when the optical fiber cable is wired to the outdoor side via the duct, the optical fiber cable has good insertability. On the other hand, since the outer jacket of the cable sheath is removed after the optical fiber cable is drawn to the indoor side, a part of the cable sheath to the inner jacket is wired to the indoor side as the optical fiber cable for indoor wiring. That is, when indoor wiring is performed, the outer jacket having low flame retardance is removed, and the inner jacket having high flame retardance becomes the outermost layer of the cable sheath. Therefore, according to the method for laying an optical fiber cable according to the above-described configuration, it is possible to efficiently lay the optical fiber cable while achieving both high flame retardance and good insertion characteristics.

(2) In the method for laying an optical fiber cable according to (1), in the step of wiring the optical fiber cable in the outdoor side, the optical fiber cable is passed through the duct by air pressure-feeding.

According to the configuration, since the optical fiber cable is inserted into the duct by air pressure-feeding, the optical fiber cable can be laid efficiently.

(3) In the method for laying an optical fiber cable according to (1) or (2), a connector is connected to end portions of the plurality of optical fibers, and the method for laying an optical fiber cable further includes: a step of storing the optical fiber cable for indoor wiring in a connection box installed in the indoor side; and a step of connecting the connector with another connector connected to another optical fiber in the connection box.

According to the configuration, in the connection box installed in the indoor side, the connector connected to the end portions of the optical fibers drawn from the outdoor side and the connector of the other optical fiber located in the indoor side are connected. Therefore, according to the method for laying an optical fiber cable according to the above-described configuration, even if fusion splicing is not performed, the optical fiber drawn from the outdoor side to the indoor side can be connected to the other optical fiber.

[Details of Embodiments of Present Disclosure]

A specific example of an optical fiber cable with a towing tool according to an embodiment of the present disclosure will be described below with reference to the drawings. Incidentally, the present disclosure is not limited to these examples but indicated by the scope of claims, and is intended to include meanings equivalent to the scope of claims and all modifications within the scope.

An optical fiber cable 100 with a towing tool according to the present embodiment will be described with reference to FIGS. 1 and 2. In the description of the present embodiment, for convenience of description, a "front-rear direction" and a "left-right direction" will be referred to as appropriate. These directions are relative directions set for the optical fiber cable 100 with a towing tool illustrated in FIG. 1. Here, the "front-rear direction" is a direction including a "front direction" and a "rear direction" in the drawings. The "left-right direction" is a direction including a "left direction" and a "right direction" in the drawings.

Figure 2:
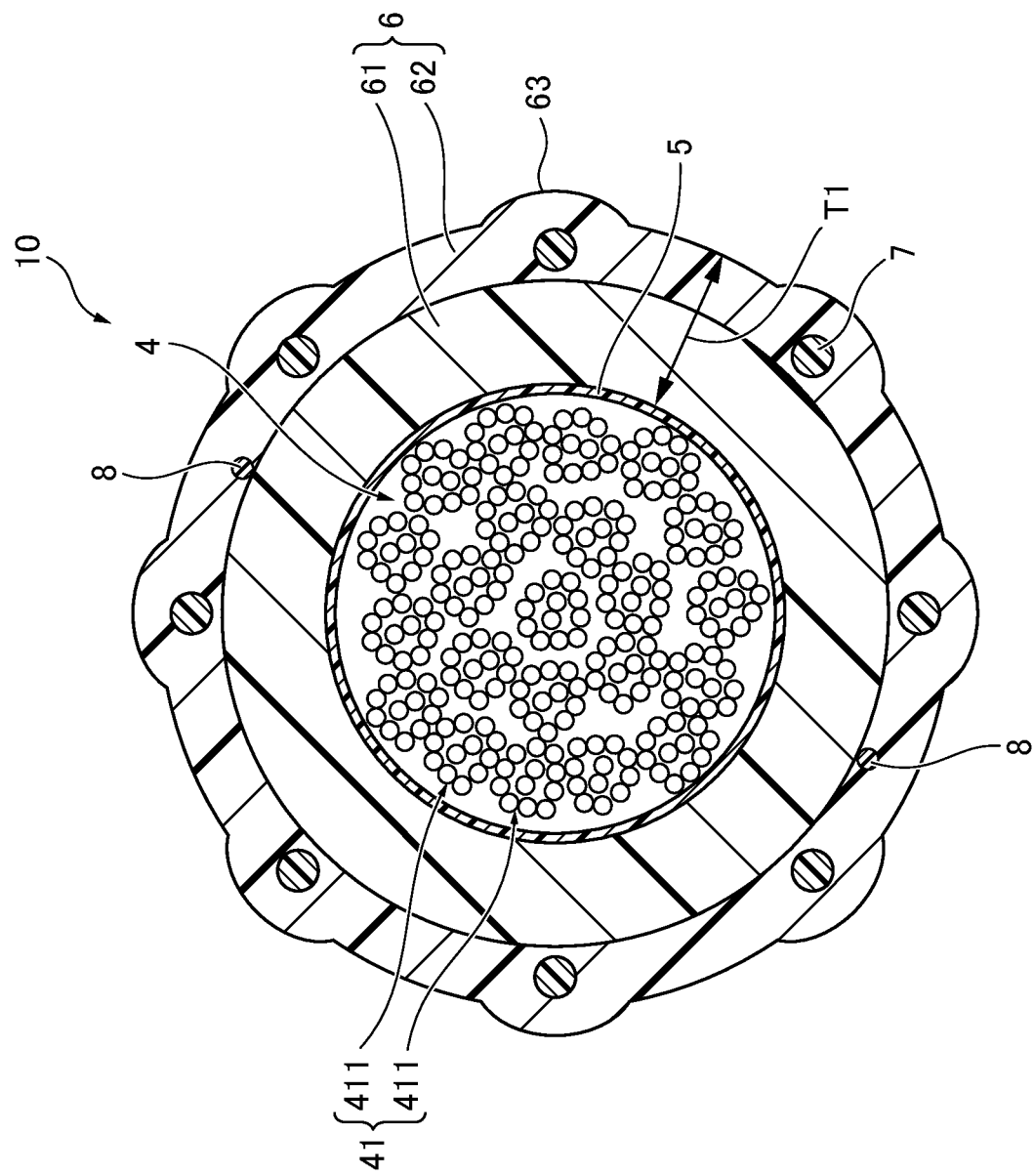
FIG. 2 is a cross-sectional view taken along a line A-A in FIG. 1.

FIG. 1 is a diagram illustrating the optical fiber cable 100 with a towing tool. FIG. 2 is a cross-sectional view taken along a line A-A in FIG. 1. As illustrated in FIG. 1, the optical fiber cable 100 with a towing tool includes an optical fiber cable 10 and a towing tool 20. The optical fiber cable 10 includes a cable body 1, a plurality of connectors 2, and pitch converters 3. The towing tool 20 includes a protective tube 21 and a pulling eye 22.

An outer diameter of the optical fiber cable 10 is, for example, about 8 mm or more and 20 mm or less. The outer diameter of the optical fiber cable 10 according to the present embodiment is about 20 mm. As illustrated in FIG. 2, the optical fiber cable 10 includes a cable core 4, a press-wrapping tape 5, a cable sheath 6, tensile strength members 7, and tearing strings (fibrous fillers) 8. The cable core 4, the press-wrapping tape 5, the cable sheath 6, the tensile strength members 7, and the tearing strings 8 are provided in the cable body 1.

For example, twelve subunits 41 are accommodated in the cable core 4. The subunit 41 includes, for example, two optical fiber ribbons 411. That is, for example, 24 optical fiber ribbons 411 are accommodated in the cable core 4. However, the number of the subunits 41 accommodated in the cable core 4 and the number of the optical fiber ribbons 411 are not limited to this example.

Figure 3:
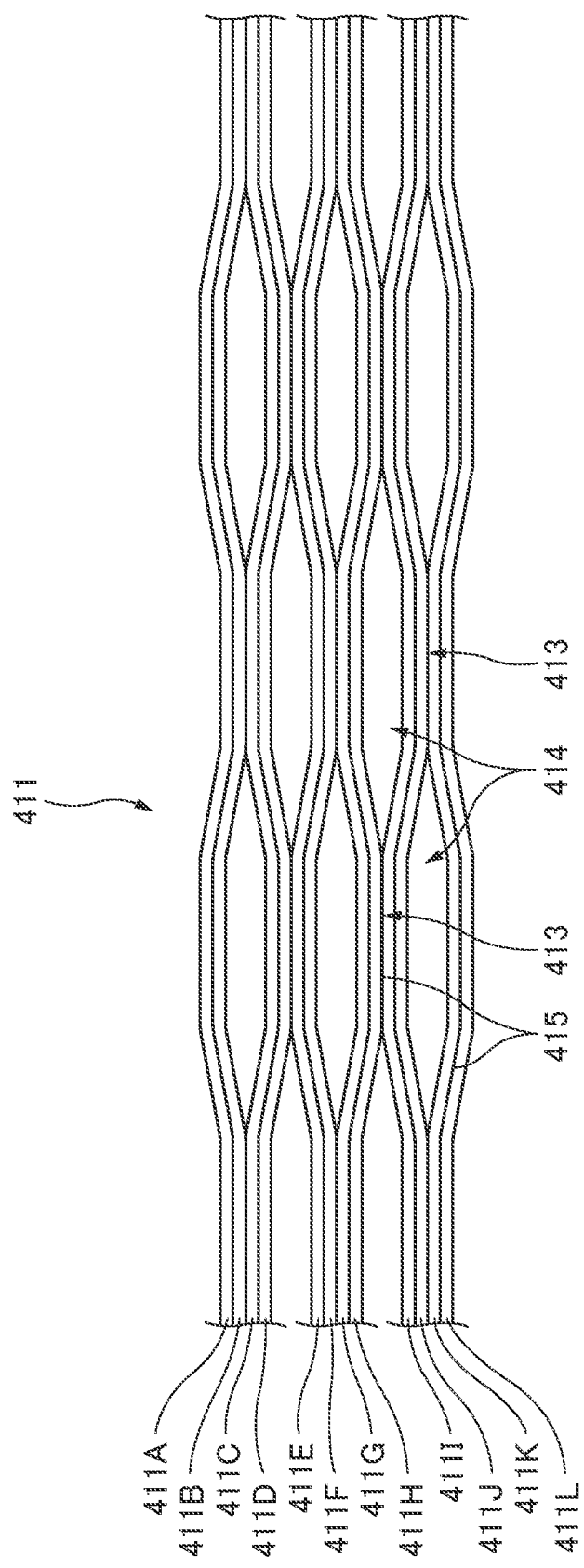
FIG. 3 is a plan view illustrating an intermittent-coupled-type optical fiber ribbon in a longitudinal direction.

Here, the optical fiber ribbon 411 will be described in detail with reference to FIG. 3. As illustrated in FIG. 3, the optical fiber ribbon 411 is an intermittent-coupled-type optical fiber ribbon in which, in a state in which a plurality of optical fibers 411A to 411L are arranged in parallel in a direction orthogonal to the longitudinal direction, a coupling portion 413 where adjacent optical fibers are coupled and a non-coupling portion 414 where adjacent optical fibers are not coupled are intermittently provided in the longitudinal direction in a part or all between the plurality of optical fibers 411A to 411L. In the present embodiment, the optical fiber ribbon 411 includes twelve optical fibers (the optical fibers 411A to 411L). Therefore, 288-core optical fibers are accommodated in the cable core 4. An outer diameter of each of the optical fibers 411A to 411L is, for example, 180 μm or 200 μm. Flame retardance may be applied to an ultraviolet curable resin with which glass of each of the optical fibers 411A to 411L is coated. Specifically, a flame retardant to be described later may be mixed into the ultraviolet curable resin.

The coupling portion 413 in the optical fiber ribbon 411 is formed, for example, by applying a coupling resin 415 made of the ultraviolet curable resin, a thermosetting resin, or the like between the optical fibers. When the coupling resin 415 is applied between the predetermined optical fibers, the coupling portion 413 and the non-coupling portion 414 are intermittently provided, and the optical fibers 411A to 411L are integrated in a parallel state. The coupling resin 415 may be applied only to one surface of the parallel surface formed by the optical fibers 411A to 411L arranged in parallel, or may be applied to both surfaces. Further, the optical fiber ribbon 411 may be manufactured, for example, in a way that a tape resin is applied to the one surface or both the surfaces of the optical fibers 411A to 411L arranged in parallel, and all the optical fibers 411A to 411L are coupled to each other, and then a part of the optical fiber ribbon 411 is cleaved by a rotary blade or the like to form the non-coupling portion 414.

Referring back to FIG. 2, the press-wrapping tape 5 will be described. For example, a tape obtained by adhering a nonwoven fabric to a base material such as PET may be used as the press-wrapping tape 5. For example, the flame retardant may be applied to the base material and the nonwoven fabric. From the viewpoint of reducing an environmental load, the flame retardant is preferably a halogen-free flame retardant such as a metal hydroxide, a nitrogen-based flame retardant, or a phosphorus-based flame retardant. However, the flame retardant may be a halogen-based flame retardant such as a bromine-based flame retardant or a chlorine-based flame retardant. A thickness of the press-wrapping tape 5 is, for example, 0.13 mm or more and 0.15 mm or less. A water absorbent (for example, water absorption powder) may be provided inside the press-wrapping tape 5. The press-wrapping tape 5 is formed of, for example, a water absorbing tape. The water absorbing tape is subjected to water absorption processing by, for example, attaching a water absorbing powder to a base fabric made of polyester or the like.

The cable sheath 6 is formed by extrusion molding a resin around the cable core 4 around which the press-wrapping tape 5 is wrapped. A thickness T1 of the cable sheath 6 (a thickness of a portion of the cable sheath 6 where protruding portions 63 to be described later are not formed) is, for example, 2.5 mm. The cable sheath 6 includes an inner jacket 61 disposed at a radially outer side of the cable core 4, and an outer jacket 62 disposed at a radially outer side of the inner jacket 61. That is, the cable sheath 6 has a two structure.

The inner jacket 61 is formed of, for example, a resin material such as a vinyl chloride resin or a polyolefin-based resin. In the present embodiment, a flame retardant similar to the flame retardant applied to the press-wrapping tape 5 may be added to the inner jacket 61. Therefore, the inner jacket 61 has high flame retardance. Since the polyolefin-based resin has a relatively low oxygen index, when the inner jacket 61 is formed of the polyolefin-based resin, the flame retardant is preferably added to the inner jacket 61. The oxygen index of the inner jacket 61 is, for example, 40 or more. Further, a coefficient of kinetic friction of the inner jacket 61 with respect to a metal plate (for example, a first metal plate 201 and a second metal plate 202 illustrated in FIG. 7) is, for example, 0.7 or less.

The outer jacket 62 is formed of the vinyl chloride resin, the halogen-free resin, or the like. In the present embodiment, the outer jacket 62 is formed of a halogen-free resin. The halogen-free resin is, for example, cross-linked polyethylene, polypropylene, polybutylene terephthalate, urethane, nylon, or the like. When the outer jacket 62 is formed of a high-flame-retardant polyolefin (an example of the halogen-free resin), it is possible to improve the flame retardance of the outer jacket 62. The oxygen index of the outer jacket 62 is, for example, 38. In the present embodiment, the oxygen index of the outer jacket 62 is lower than the oxygen index of the inner jacket 61. That is, the oxygen index of the inner jacket 61 is higher than the oxygen index of the outer jacket 62. Therefore, the inner jacket 61 has flame retardance higher than the outer jacket 62.

The outer jacket 62 may contain, for example, a silicon-based release agent such as silicone or siloxane. In this case, the outer jacket 62 has low frictional properties. A coefficient of kinetic friction of the outer jacket 62 with respect to the metal plate (for example, the first metal plate 201 and the second metal plate 202 illustrated in FIG. 7) is smaller than the coefficient of kinetic friction of the inner jacket 61 with respect to the metal plate. The coefficient of kinetic friction of the outer jacket 62 with respect to the metal plate is, for example, 0.5 or less. The plurality of tensile strength members 7 are embedded in the outer jacket 62 at uniform intervals, that is, at equal intervals. However, the interval between the tensile strength members 7 may not be uniform. In the present embodiment, eight tensile strength members 7 are embedded in the outer jacket 62. However, the number of the tensile strength members 7 embedded in the outer jacket 62 is not limited to eight.

The outer jacket 62 has the plurality of protruding portions 63. In the present embodiment, the outer jacket 62 has eight protruding portions 63. However, the number of the protruding portions 63 provided in the outer jacket 62 is not limited to eight. The protruding portion 63 is a protruding portion formed in an arc shape. The protruding portion 63 may be provided at a position close to a position where the tensile strength member 7 is embedded in the outer jacket 62. The protruding portion 63 is provided outside the tensile strength member 7 and protrudes outward from the optical fiber cable 10.

A diameter of the tensile strength member 7 is, for example, 0.5 mm. The tensile strength member 7 is formed of, for example, a fiber-reinforced plastic (FRP) such as aramid FRP, glass FRP, or carbon FRP. However, the tensile strength member 7 may be formed of a liquid crystal polymer. The tensile strength member 7 is preferably non-inductive. The fiber-reinforced plastic (FRP) is generally a combustible material. From the viewpoint of improving the flame retardance of the entire optical fiber cable 10, it is preferable that the tensile strength member 7 is disposed not in the vicinity of a surface layer of the outer jacket 62 but in a position close to the center of the optical fiber cable 10 in the outer jacket 62.

The tearing string 8 is provided to tear the outer jacket 62 of the cable sheath 6. The tearing string 8 is linearly disposed in the outer jacket 62 along the plurality of twisted optical fiber ribbons 411 in the longitudinal direction of the optical fiber cable 10. In the present embodiment, two tearing strings 8 are provided. The two tearing strings 8 are provided so as to face each other in a cable cross-sectional view. An operator can tear the outer jacket 62 in the longitudinal direction and take out the optical fiber ribbon 411 by pulling out the tearing string 8. The tearing string 8 is fibrous, and is formed of, for example, a plastic material (for example, polyester) resistant to tension.

Referring back to FIG. 1, the connector 2 will be described. The connector 2 is, for example, a small-sized 96-core connector. However, the connector 2 is not limited to the 96-core connector. Further, a connector having a different core number (for example, a 24-core connector, a 192-core connector, or the like) may be used in combination. The optical fiber cable 10 includes, for example, three 96-core connectors. The connector 2 is housed in the protective tube 21. The connector 2 is connected to an end portion of the optical fiber ribbon 411 (see FIG. 3).

The pitch converter 3 is provided between an end portion of the optical fiber ribbon 411 and the end of the connector 2. The pitch converter 3 is configured to convert a pitch of the optical fibers 411A to 411L. In the present embodiment, the pitch of the optical fibers 411A to 411L in the optical fiber ribbon 411 is 200 μm, and an arrangement pitch in the connector 2 is 250 μm. The pitch converter 3 converts the pitch of the optical fibers 411A to 411L from 200 μm to 250 μm by separating the plurality of optical fibers 411A to 411L and increasing the pitch. Accordingly, the plurality of optical fibers 411A to 411L are connected to the connector 2 at the pitch of 250 μm. The pitch converter 3 may not be required if there is no need to convert the pitch.

The protective tube 21 has a substantially cylindrical shape. A front end portion of the protective tube 21 has a spherical shape. An outer diameter of the protective tube 21 is, for example, 25 mm or less. The protective tube 21 is provided at a front end portion of the optical fiber cable 100 with a towing tool. The surface of the protective tube 21 is coated with, for example, polyvinyl chloride or the like. The outer diameter of the protective tube 21 is larger than an outer diameter of the cable body 1 and an outer diameter of the pulling eye 22.

A rear end portion of the pulling eye 22 is connected to the front end portion of the protective tube 21. The pulling eye 22 is formed of a material having sufficient strength to pull the optical fiber cable 10. Such a material is, for example, a metal such as iron. The pulling eye 22 has a hollow portion 221. A cable laying worker (operator) can pull the optical fiber cable 10 by, for example, connecting a wire or the like to the hollow portion 221 and pulling the wire by means of a winch.

(Method for Laying Optical Fiber Cable 10)

Next, a method for laying the optical fiber cable 10 will be described with reference to FIGS. 4 to 6. In the present embodiment, by inserting the optical fiber cable 100 with a towing tool into a duct 70 provided in the ground or the like, the optical fiber cable 10 is drawn from an outdoor side 91 to an indoor side 92. The duct 70 is made of, for example, a metal material such as stainless steel. The duct 70 has, for example, a substantially cylindrical shape. The duct 70 is fixed to, for example, a wall surface or a bottom surface.

Figure 4:
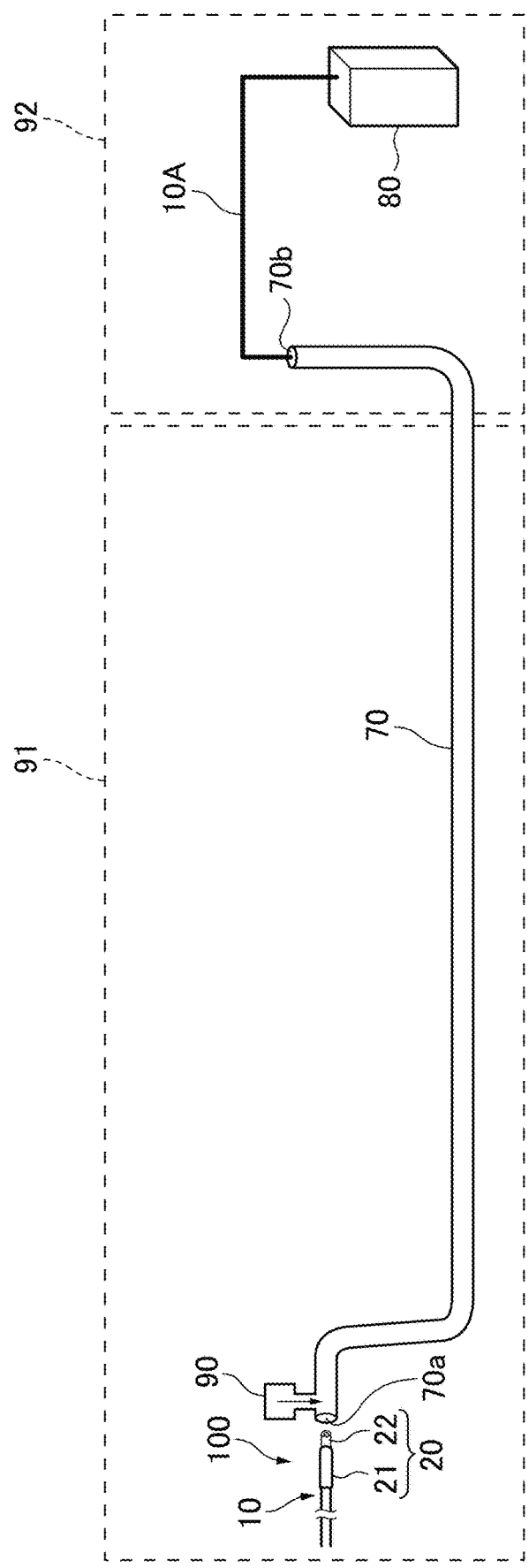
FIG. 4 is a diagram illustrating an example of laying the optical fiber cable.
Figure 5:
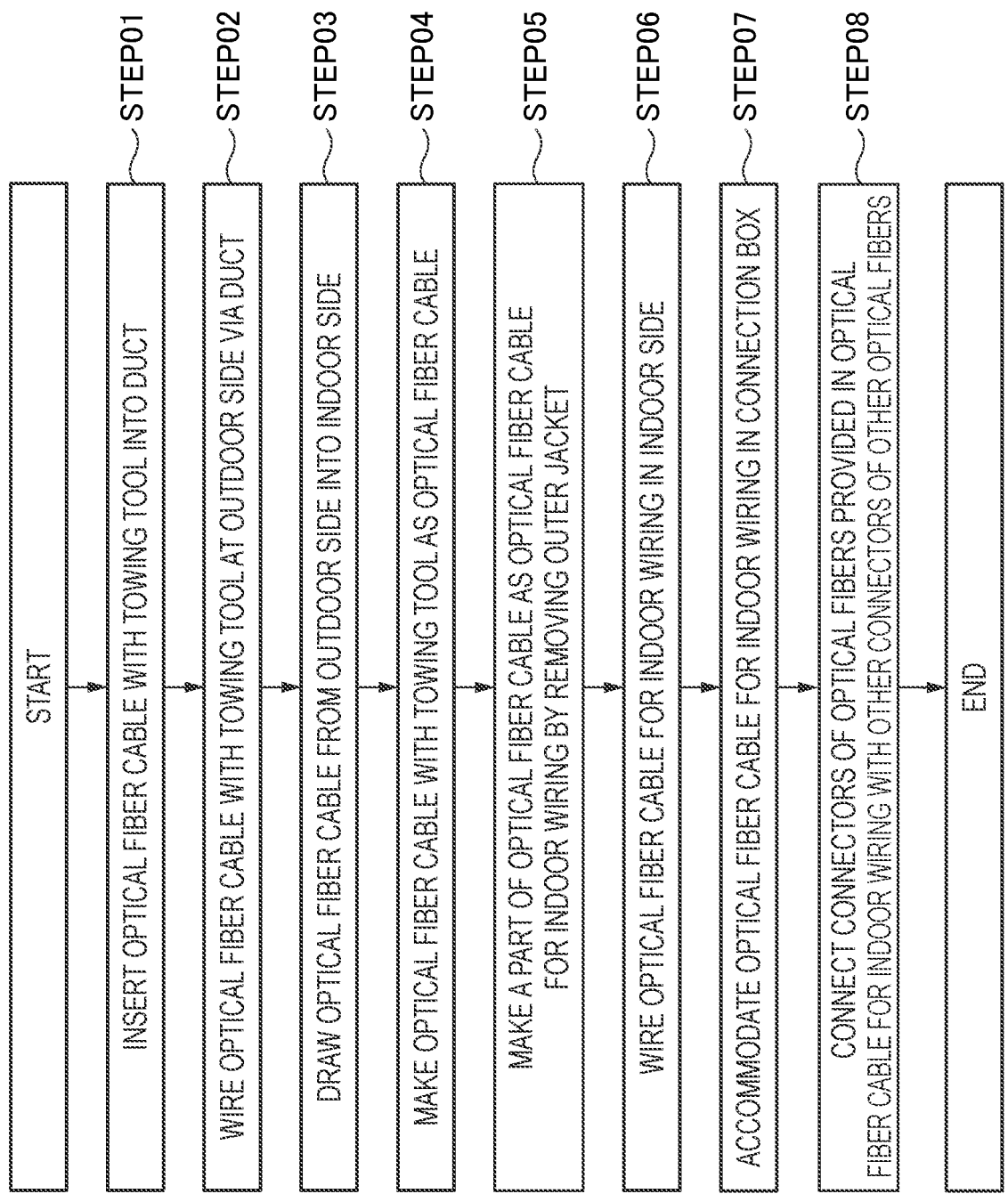
FIG. 5 is a flowchart related to a method for laying an optical fiber cable according to an aspect of the present embodiment.
Figure 6:
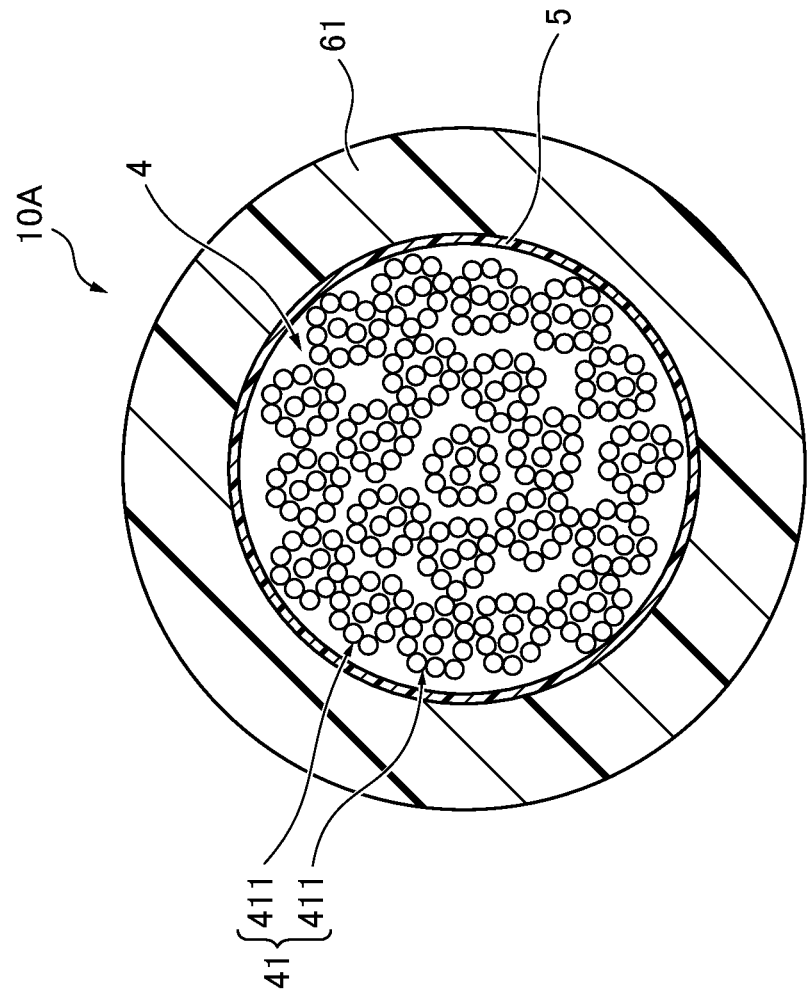
FIG. 6 is a cross-sectional view of the optical fiber cable for indoor wiring.

As illustrated in FIGS. 4 and 5, the cable laying worker inserts the optical fiber cable 100 with a towing tool into the duct 70 from an inlet 70a of the duct 70 (STEP 01).

The cable laying worker feeds compressed air into the duct 70 by using a blower 90 disposed in the vicinity of the inlet 70a of the duct 70. When the compressed air is fed into the duct 70, the optical fiber cable 100 with a towing tool is pressure-fed toward an outlet 70b by the compressed air. That is, in the present embodiment, the optical fiber cable 100 with a towing tool is air-pressure fed. In this manner, the optical fiber cable 100 with a towing tool is wired at the outdoor side 91 via the duct 70 (STEP 02). When the optical fiber cable 100 with a towing tool passes through the duct 70, portions of the optical fiber cable 100 with a towing tool in contact with the duct 70 are only the protruding portions 63 (see FIG. 2). Therefore, insertion characteristics of the optical fiber cable 100 with a towing tool are better than insertion characteristics of an optical fiber cable without the protruding portion 63. The optical fiber cable 10 may be wired at the outdoor side 91 by being pulled inside the duct 70 using the towing tool 20 without pressure-feeding the air.

The cable laying worker feeds the compressed air into the duct 70 until the pulling eye 22 comes out of the outlet 70b of the duct 70. In this manner, the cable laying worker wires the optical fiber cable 100 with a towing tool at the outdoor side 91 and draws the optical fiber cable 100 from the outdoor side 91 into the indoor side 92 (STEP 03).

When the pulling eye 22 comes out of the outlet 70b, the cable laying worker removes the towing tool 20 from the optical fiber cable 100 with a towing tool. In this manner, the cable laying worker makes the optical fiber cable 100 with a towing tool as the optical fiber cable 10 without the towing tool 20 (STEP 04).

The cable laying worker draws the optical fiber cable 10 into the indoor side 92 and then removes the outer jacket 62 of the optical fiber cable 10, thereby making the optical fiber cable 10 as an optical fiber cable 10A for indoor wiring (STEP 05). A cross-sectional view of the optical fiber cable 10A for indoor wiring is as illustrated in FIG. 6. As illustrated in FIG. 6, the optical fiber cable 10A for indoor wiring includes the cable core 4, the press-wrapping tape 5, and the inner jacket 61. The configurations of the cable core 4, the press-wrapping tape 5, and the inner jacket 61 provided in the optical fiber cable 10A for indoor wiring are the same as those of the cable core 4, the press-wrapping tape 5, and the inner jacket 61 provided in the optical fiber cable 10. As illustrated in FIG. 6, the outermost jacket of the optical fiber cable 10A for indoor wiring is the inner jacket 61 of the cable sheath 6.

Referring back to FIG. 4 and FIG. 5, STEP 06 will be described. When the optical fiber cable 10 is used as the optical fiber cable 10A for indoor wiring, the cable laying worker wires the optical fiber cable 10A for indoor wiring in the indoor side 92 (STEP 06).

When the optical fiber cable 10A for indoor wiring is wired to the indoor side 92, the cable laying worker accommodates the optical fiber cable 10A for indoor wiring in a connection box 80 installed in the indoor side 92 (STEP 07). Since the optical fiber cable 10A for indoor wiring does not include the outer jacket 62 in which the tensile strength member 7 is embedded, flexibility is higher than that of the optical fiber cable 10. Therefore, since the optical fiber cable 10A for indoor wiring can be bent to a small diameter, the optical fiber cable 10A can be easily accommodated in the connection box 80 installed in the indoor side 92. The connection box 80 is, for example, a connection cabinet or the like.

The cable laying worker connects the connector 2 to another connector of another optical fiber cable, an optical communication unit, or the like in the connection box 80. That is, the cable laying worker connects the optical fibers 411A to 411L provided in the optical fiber cable 10A for indoor wiring with other optical fibers located in the indoor side 92 (STEP 08). As described above, in the present embodiment, the optical fibers 411A to 411L provided in the indoor wiring optical fiber cable 10A and the other optical fibers provided in the indoor space 92 can be connected by the connectors 2 without being fusion-spliced.

(Measurement of Coefficient of Kinetic Friction of Outer Jacket of Cable Sheath)

Figure 7:
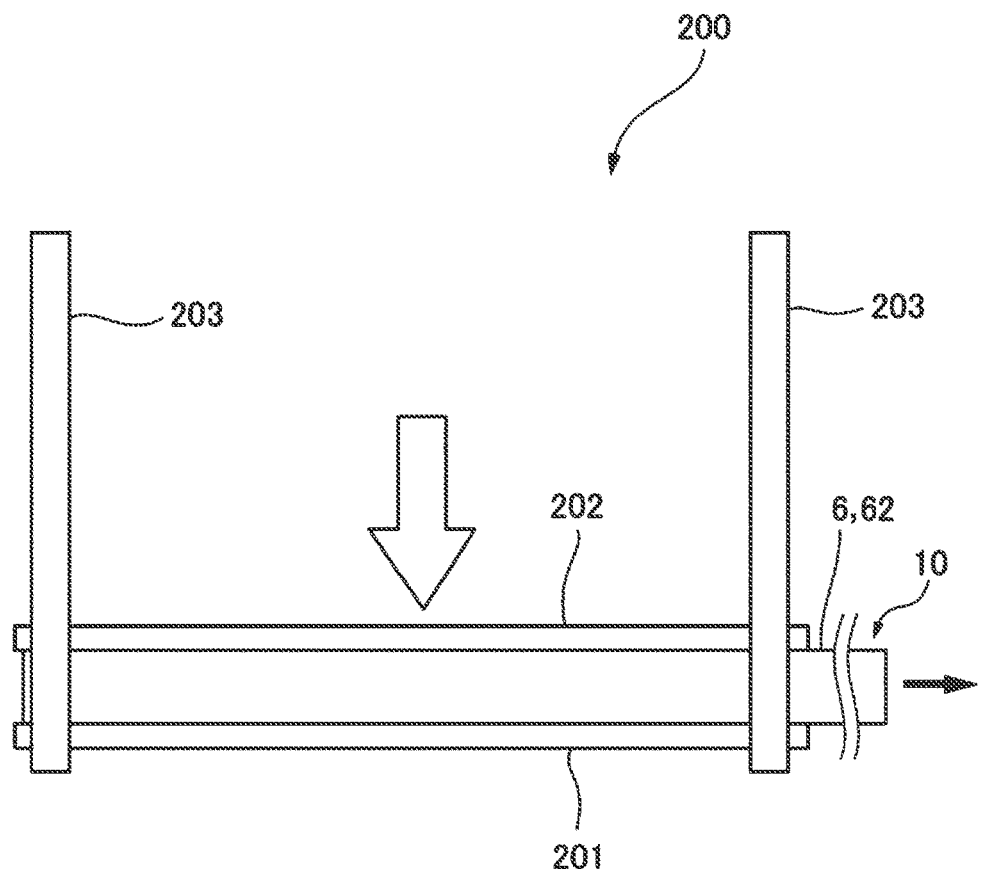
FIG. 7 is a diagram illustrating a measurement device for measuring a coefficient of kinetic friction of the optical fiber cable according to the aspect of the present embodiment.

The inventor conducted an experiment using a measurement device 200 illustrated in FIG. 7 in order to measure the coefficient of kinetic friction of the outer jacket 62 of the cable sheath 6. As illustrated in FIG. 7, the measurement device 200 includes the first metal plate 201, the second metal plate 202, and four cylindrical members 203. The four cylindrical members 203 are inserted through hole portions provided at four corners of the first metal plate 201 and the second metal plate 202, respectively. In FIG. 7, only two cylindrical members 203 are illustrated for convenience of illustration. The first metal plate 201 and the second metal plate 202 are flat plates made of stainless steel in order to simulate the wall surface of the duct used when the optical fiber cable is inserted.

The inventor has measured the coefficient of kinetic friction of the outer jacket of the cable sheath by a method for sandwiching the optical fiber cable between the first metal plate 201 and the second metal plate 202 disposed above the first metal plate 201 and pulling the optical fiber cable in the longitudinal direction of the metal plate (a right direction in FIG. 7) from a state in which a load is applied to the second metal plate 202. In this experiment, the load of about 2.0 kg was applied to the second metal plate 202. The length of the optical fiber cable is about 300 mm. The length of the first metal plate 201 and the second metal plate 202 in the longitudinal direction is about 150 mm. A tensile speed of the optical fiber cable is about 500 mm/min. In the present embodiment, the coefficient of kinetic friction was evaluated using an average value of tensile forces. The optical fiber cable used in the experiment is the 288-core optical fiber cables illustrated in FIG. 1.

As a result of the experiment using the measurement device 200, it was confirmed that the coefficient of kinetic friction of the outer jacket 62 of the cable sheath 6 was 0.5 or less. Further, it was confirmed that the coefficient of kinetic friction of the inner jacket 61 of the cable sheath 6 was greater than 0.5 and 0.7 or less.

(Pressure-Feeding Evaluation of Optical Fiber Cable)

Figure 8:
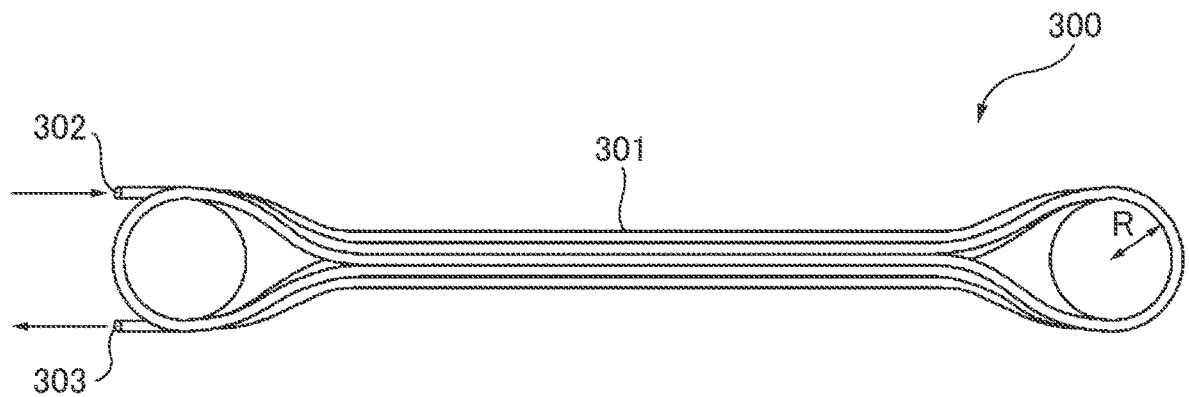
FIG. 8 is a diagram illustrating a pressure-feeding device for performing a pressure-feeding evaluation of the optical fiber cable.

In order to perform a pressure-feeding evaluation of the optical fiber cable 10, the inventor performed a pressure-feeding test based on an IEC using the pressure-feeding device 300 illustrated in FIG. 8. The length of the pipe 301 is 1000 m, and is folded back at intervals of 100 m. A radius of curvature R of the pipe 301 is 40 times an inner diameter of the pipe, and an inner diameter of the pipe 301 is 14 mm. An outer diameter of the optical fiber cable 10 is 20 mm. An opening 302 is an inlet of the air and the optical fiber cable, and the opening 303 is an outlet of the air and the optical fiber cable. The air pressure was set to 1.3 MPa or more and 1.5 MPa or less.

In the pressure-feeding test, those having a pressure-feeding distance of 1000 m or more were evaluated as good, and those having a pressure-feeding distance of less than 1000 m were evaluated as poor. The longer the pressure-feeding distance is, the better the insertion characteristics of the optical fiber cable is. That is, as the pressure-feeding distance is longer, the optical fiber cable has good low-friction property.

As a result of the pressure-feeding test using the pressure-feeding device 300, it was confirmed that the pressure-feeding distance of the optical fiber cable 10 was 1000 m or more. Therefore, it was confirmed that the insertion characteristics of the optical fiber cable were good.

(Evaluation of Flame Retardance of Optical Fiber Cable)

In order to evaluate the flame retardance of the optical fiber cable 10A for indoor wiring, the inventor performed a combustion test based on a combustion test by the plenum test UL910 (NFPA262).

In the combustion test performed by the plenum test UL910, the flame retardance is evaluated by performing a combustion test among flame retardance standards that are determined by Underwriters Laboratory (UL). Although the combustion test may be different depending on the shape of a sample, grades such as CMX (combustion test, normally referred to as VW-1 test), CM (vertical tray combustion test), CMR (riser test), CMP (plenum test), and the like are set in descending order of combustion performance. The plenum test employed in the present embodiment is a test in which an optical fiber cable is laid in a plenum space that is a space in which air is always flowing by air conditioning. The plenum space is, for example, in a ceiling or the like. In the plenum test according to the present embodiment, the flame retardance of the optical fiber cable was evaluated by igniting the optical fiber cable disposed in the plenum space and evaluating a fire spreading property and a fuming property of the optical fiber cable.

In the present embodiment, the optical fiber cable satisfying the predetermined standard in the combustion test by the plenum test UL910 was evaluated as good, and the optical fiber cable failing to satisfy the predetermined standard was evaluated as poor.

As a result of the combustion test by the plenum test UL910, it was confirmed that the optical fiber cable 10A for indoor wiring satisfies the predetermined standard in the combustion test by the plenum test UL910. Therefore, it was confirmed that the flame retardance of the optical fiber cable 10A for indoor wiring was good.

According to the method for laying the optical fiber cable 10 as described above, after the optical fiber cable 10 is drawn from the outdoor side 91 to the indoor side 92, the outer jacket 62 of the cable sheath 6 is removed, so that a part of the optical fiber cable 10 is made as the optical fiber cable 10A for indoor wiring. Therefore, since the optical fiber cable 10 includes the low-frictional outer jacket 62 including the tensile strength member 7 when the optical fiber cable 10 is wired to the outdoor side 91 via the duct 70, the optical fiber cable 10 has good insertability. On the other hand, since the outer jacket 62 of the cable sheath 6 is removed after the optical fiber cable 10 is drawn to the indoor side 92, a part of the cable sheath 6 to the inner jacket 61 of the cable sheath 6 is wired to the indoor side 92 as the optical fiber cable 10A for indoor wiring. That is, when indoor wiring is performed, the outer jacket 62 having low flame retardance is removed, and the inner jacket 61 having high flame retardance becomes the outermost layer of the cable sheath 6. In addition, it is not necessary for the optical fiber cable 10A for indoor wiring to be fusion-spliced to another optical fiber cable in the indoor side 92. That is, the optical fiber cable 10A for indoor wiring drawn to the indoor space 92 can be used as it is as an indoor cable without being fusion spliced. Therefore, according to the method for laying the optical fiber cable 10, it is possible to efficiently lay the optical fiber cable 10 while achieving both high flame retardance and good insertion characteristics for the optical fiber cable 10.

According to the method for laying the optical fiber cable 10 as described above, since the optical fiber cable 10 is inserted into the duct 70 by air pressure-feeding, the optical fiber cable 10 can be laid efficiently.

According to the method for laying the optical fiber cable 10 as described above, in the connection box 80, the connectors 2 connected to the end portions of the optical fibers 411A to 411L drawn from the outdoor side 91 and the other connectors of the other optical fibers located in the indoor side 92 are connected. Therefore, according to the method for laying the optical fiber cable 10 as described above, the optical fibers 411A to 411L drawn from the outdoor side 91 to the indoor side 92 can be connected to the other optical fibers without being fusion spliced.

Although the present disclosure has been described in detail with reference to a specific embodiment, it will be apparent to those skilled in the art that various changes and modifications can be made without departing from the spirit and scope of the present disclosure. The numbers, positions, shapes and the like of components described above are not limited to the above embodiment and can be changed to suitable numbers, positions, shapes and the like on a premise that the present disclosure is carried out.

In the above-described embodiment, the optical fiber cable 10 includes the connectors 2 and the pitch converters 3, but may not include at least one of the connector 2 and the pitch converter 3.

In the above-described embodiment, the number of the connectors 2 provided in the optical fiber cable 10 and the core number of the connector 2 are not limited to the numbers illustrated in the above-described embodiment. For example, the optical fiber cable 10 may include two 96-core connectors and four 24-core connectors.

In the above-described embodiment, the cable core 4 accommodates the plurality of optical fibers collected as the optical fiber ribbon 411, but the plurality of optical fibers may be single-core optical fibers.

In the above-described embodiment, the optical fiber cable 10 includes the press-wrapping tape 5, but may not include the press-wrapping tape 5.

In the above-described embodiment, the method for laying the optical fiber cable 10 by air pressure-feeding has been described, but the present disclosure is not limited to this example. For example, the optical fiber cable 10 may be laid by connecting a wire to the hollow portion 221 of the pulling eye 22 and pulling the wire from the outlet 70b of the duct 70 with the winch.

What is claimed is:

1. A method for laying an optical fiber cable including a cable core that includes a plurality of optical fibers, a cable sheath that includes an inner jacket disposed at a radially outer side of the cable core, and an outer jacket disposed at a radially outer side of the inner jacket, and at least one tensile strength member embedded in the outer jacket, a first kinetic friction coefficient of the outer jacket with respect to a duct being smaller than a second kinetic friction coefficient of the inner jacket with respect to the duct, first flame retardance of the inner jacket being higher than the second flame retardance of the outer jacket, the method comprising:

wiring the optical fiber cable in an outdoor side via the duct;

drawing the optical fiber cable from the outdoor side to an indoor side;

making a part of the optical fiber cable as an optical fiber cable for indoor wiring by removing the outer jacket after the drawing of the optical fiber; and wiring the optical fiber cable for indoor wiring in the indoor side.

2. The method for laying an optical fiber cable according to claim 1, wherein in the wiring the optical fiber cable in the outdoor side, the optical fiber cable is passed through the duct by air pressure-feeding.

3. The method for laying an optical fiber cable according to claim 1, wherein a first connector is connected to end portions of the plurality of optical fibers, the method for laying an optical fiber cable further comprises:

storing the optical fiber cable for indoor wiring in a connection box installed in the indoor side; and connecting the first connector with a second connector connected to another optical fiber in the connection box.

\* \* \* \* \*